United States Patent [19]
Brown

[11] Patent Number: 5,421,320
[45] Date of Patent: Jun. 6, 1995

[54] CONVEYOR OVEN EXHAUST SYSTEM

[75] Inventor: C. Scott Brown, Loganspor, Ind.

[73] Assignee: LDI Mfg. Co., Inc., Logansport, Ind.

[21] Appl. No.: 250,300

[22] Filed: May 27, 1994

[51] Int. Cl.$^6$ ............................................. F24C 15/20
[52] U.S. Cl. ............................ 126/299 R; 126/19 R; 454/57; 454/65
[58] Field of Search ............ 126/299 R, 299 D, 19 R; 454/57, 63, 65; 432/65

[56] References Cited

U.S. PATENT DOCUMENTS

| | | |
|---|---|---|
| 2,874,627 | 2/1959 | Simmonds . |
| 3,980,072 | 9/1976 | Jacobs . |
| 4,089,327 | 5/1978 | Welsh . |
| 4,122,834 | 10/1978 | Jacobs . |
| 4,291,668 | 9/1981 | Moeller . |
| 4,467,782 | 8/1984 | Russell . |
| 4,616,562 | 10/1986 | Kuechler . |
| 4,643,167 | 2/1987 | Brewer ............................ 126/299 R |
| 4,738,243 | 4/1988 | Welsh et al. . |
| 4,738,244 | 4/1988 | Welsh . |

*Primary Examiner*—Carroll B. Dority
*Attorney, Agent, or Firm*—Woodard, Emhardt, Naughton, Moriarty & McNett

[57] ABSTRACT

A hood is assembled of modules including a central make-up air plenum module directly over the heating stations of a conveyorized double-deck oven, an exhaust plenum module atop the makeup air plenum and downwardly-opening end modules overhang the conveyor end portions extending outside the sides of the oven heating chambers. The end modules have make-up air directors aiming make-up air upward along the undersides of removable panels having slots therein to accelerate exhaust flow into a chamber below filters to effectively remove fumes from the areas above the conveyor ends. The overhanging end modules also have partitions therein cooperating with the walls of the overhang portions to provide ducts at the front of the overhang portions to capture fumes from the area above the front of the conveyor ends. Air flow guides around the extending portions of the conveyors assist. A makeup air diverter and diffuser are provided, discharging air from the front of the makeup air plenum down the front of the ovens to cool the front exterior surfaces.

27 Claims, 8 Drawing Sheets

CONVEYOR OVEN EXHAUST SYSTEM

BACKGROUND OF THE INVENTION

1. Field of the Invention

This invention relates generally to kitchen exhaust systems, and more particularly to an exhaust system for a conveyorized oven such as a pizza oven, for example.

2. Description of the Prior Art

U.S. Pat. No. 4,738,243 issued to Clarke T. Welsh et al. and owned by LDI Mfg. Co., Inc. discloses a hood system for a conveyorized cooking oven. That system uses air flow directors at the ends of the conveyors to direct heat and fumes into the exhaust hood. Although that system is very efficient, there are some situations in which it is desirable that not all of the air exhausted through the hood, comes from the surrounding room.

There are many examples of kitchen exhaust hoods in which there are provisions for supplying make-up air (MUA) directly from outside the building through the hood into the area above a cook top or fryer or other cooking apparatus. Such provisions can reduce the amount of room air taken from the kitchen to acceptable levels, consistent with overall building requirements for suitably heating or cooling room air for the comfort of personnel. There is also a U.S. Pat. No. 4,616,562 which discloses a ventilation system for pizza ovens and in which make-up air is provided along the sides and across the front of the oven to cool the exterior surfaces and is then exhausted to the exterior. FIGS. 5-8 of that patent show an adaptation to a conveyor-type pizza oven. It is desirable to have a conveyor oven exhaust system which is better suited to the variety of conveyorized pizza cooking ovens which are available in the market. The present invention is addressed to that need.

SUMMARY OF THE INVENTION

Described briefly, according to a typical embodiment of the present invention, a hood assembly includes a hood with a central header portion employed to cover the top of an oven. The hood has overhang portions at opposite ends of the central portion and which extend on both sides of the oven over the conveyors. The central portion of the hood includes a makeup air plenum immediately above the oven, and an exhaust plenum atop the makeup air plenum. The overhang portions have make-up air directors and exhaust flow accelerators cooperating to effectively remove fumes from the areas above the conveyor ends. The overhang portions also have partitions therein cooperating with the walls of the overhang portions to provide ducts at the front of the overhang portions to capture fumes from the area above the front of the conveyor ends. A makeup air diffuser is provided, discharging air from the front of the makeup air plenum to direct a curtain of makeup air down the front of the ovens to cool the front exterior surfaces of the oven.

DESCRIPTION OF THE PREFERRED EMBODIMENT

Figure 1:
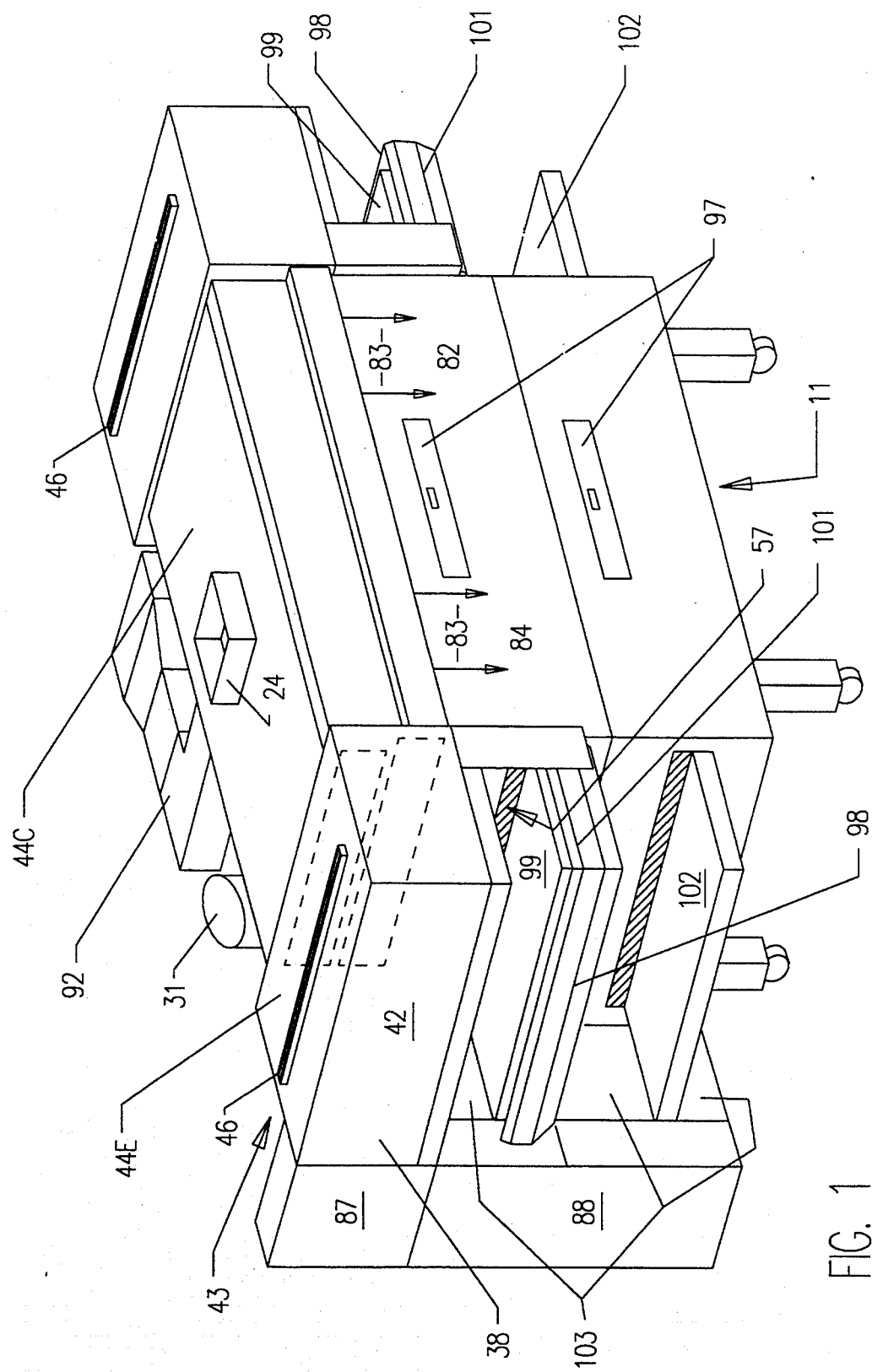
FIG. 1 is a pictorial view of a conveyor oven exhaust system according to a typical embodiment of the present invention employed with a double deck conveyorized pizza oven.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
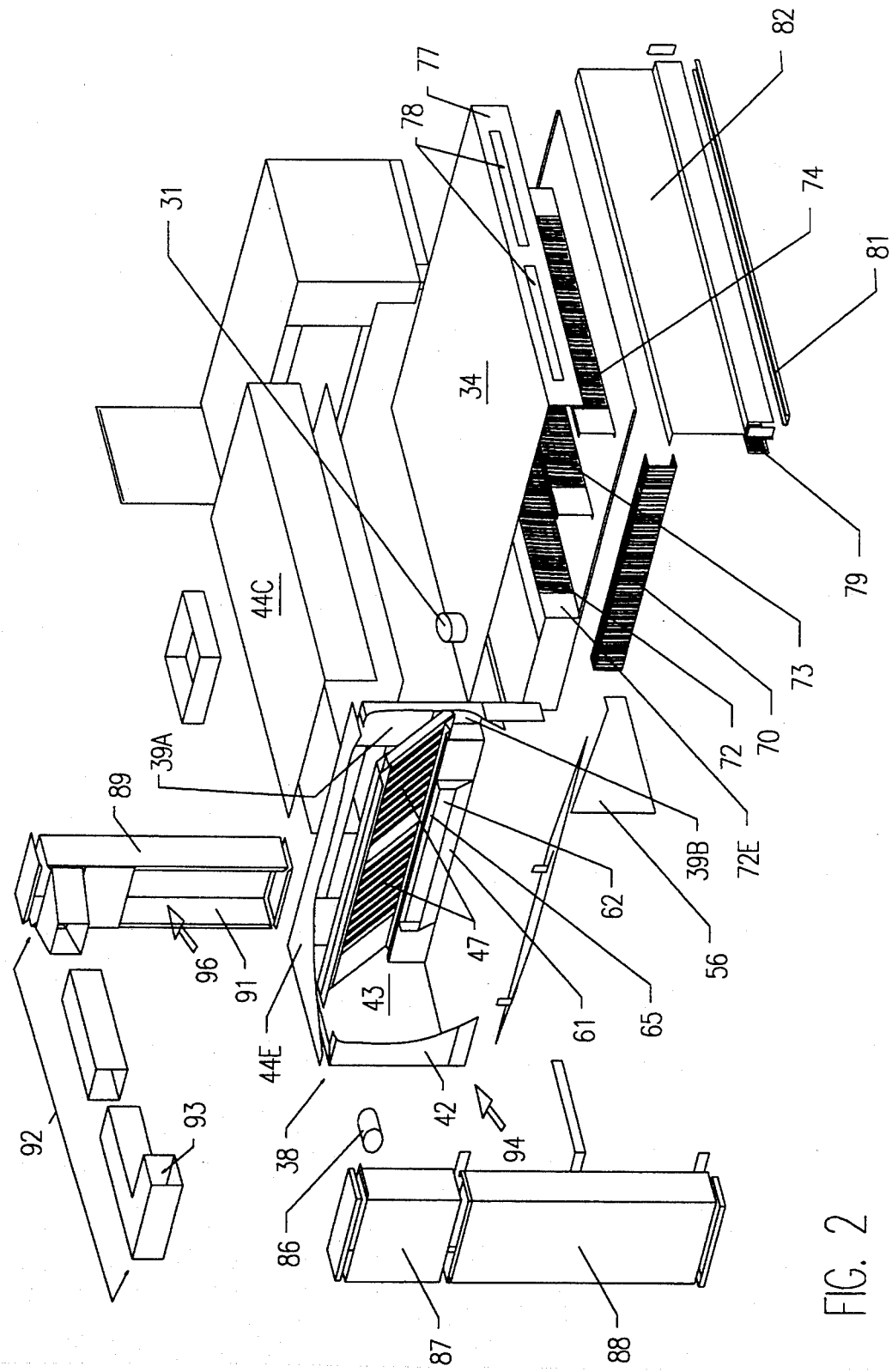
FIG. 2 is an exploded view of the system of FIG. 1 but omitting the oven.
Figure 3:
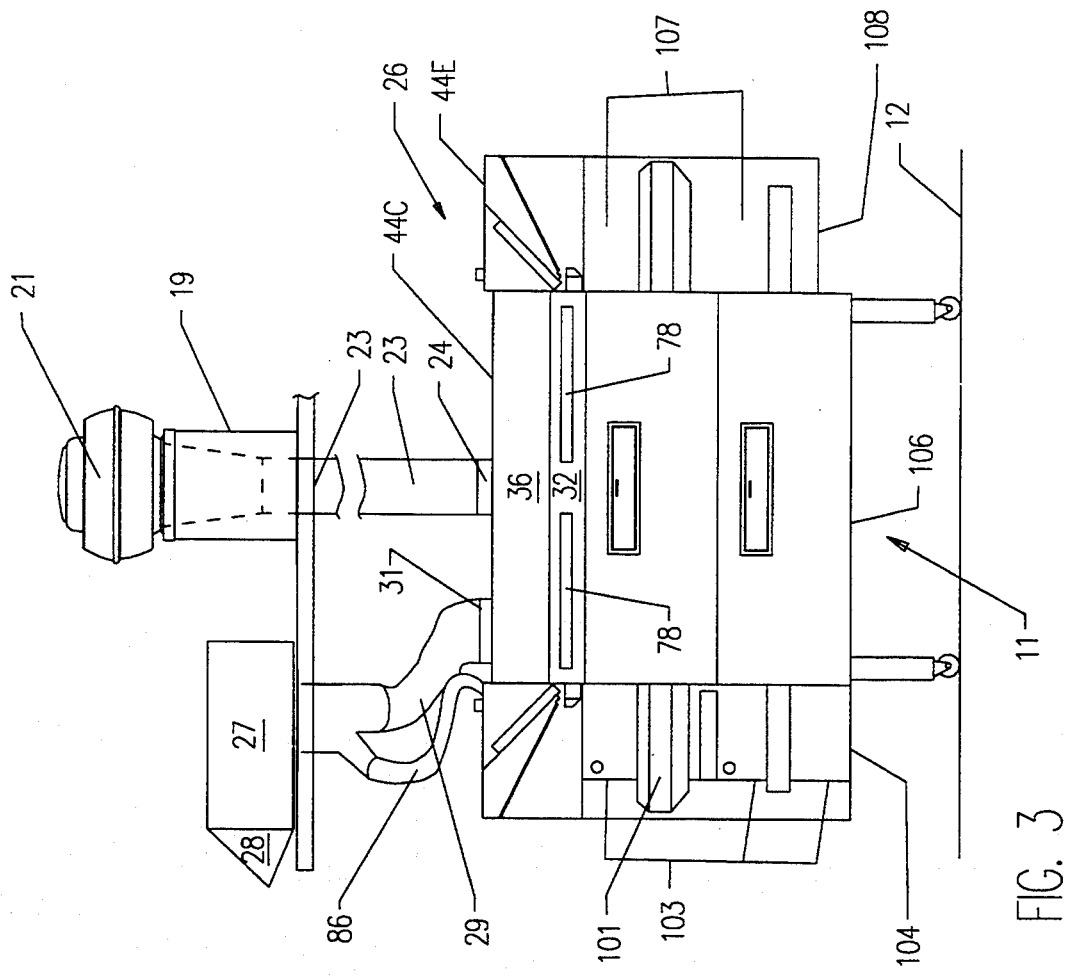
FIG. 3 is a front elevational view of the double deck conveyorized pizza oven and hood assembly installation according to a typical embodiment of the present invention, with the front wall of the exhaust and makeup air plenums cut away.
Figure 4:
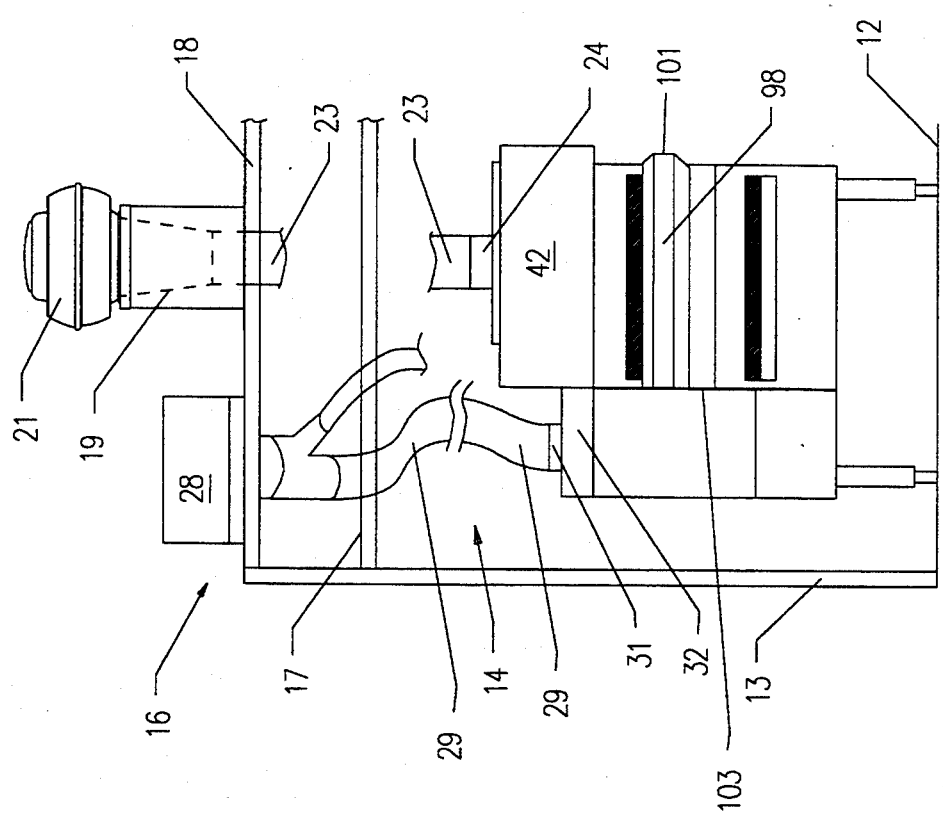
FIG. 4 is a side elevational view thereof in a building room.

Referring now to the drawings in detail, and particularly FIGS. 1-3, the conveyor oven assembly 11 is shown sitting on the floor 12 in front of the wall 13 of the room 14 in building 16. The ceiling is at 17 under roof 18 supporting a roof curb 19 under the exhaust blower 21. The illustrated blower exhausts air upward. The exhaust blower intake is connected to a conduit 23 which may be referred to either as an exhaust "drop" or exhaust "stack" which is connected to an exhaust collar 24 at the top of a hood assembly 26 which hangs from the ceiling over the oven assembly and is built and located according to a typical embodiment of the present invention.

Make-up air is provided by a blower in the cabinet 27 taking outside air through the rain hood 28 and supplying it down through the duct 29 into the main supply collar 31 which feeds air into the make-up air plenum 32 through a hole 33 in the top 34 thereof.

In the illustrated example, the pizza oven is the Model PH 3870 by Blodgett Oven Company of 50 Lakeside Ave., Burlington, Vt., U.S.A. This is only an example, as the present invention can be used with various other conveyorized ovens. With the Blodgett oven, the make-up air plenum assembly portion of the hood assembly hangs directly above the oven upper deck. The exhaust plenum 36 is atop the make-up air plenum assembly, the exhaust plenum bottom wall 37 being secured to the make-up air plenum top 34.

While the make-up air plenum and exhaust plenum comprise the central portion of the hood, there are end portions overhanging the conveyors at the sides of the oven. A description of one of the overhang portions will suffice for both.

Figure 5:
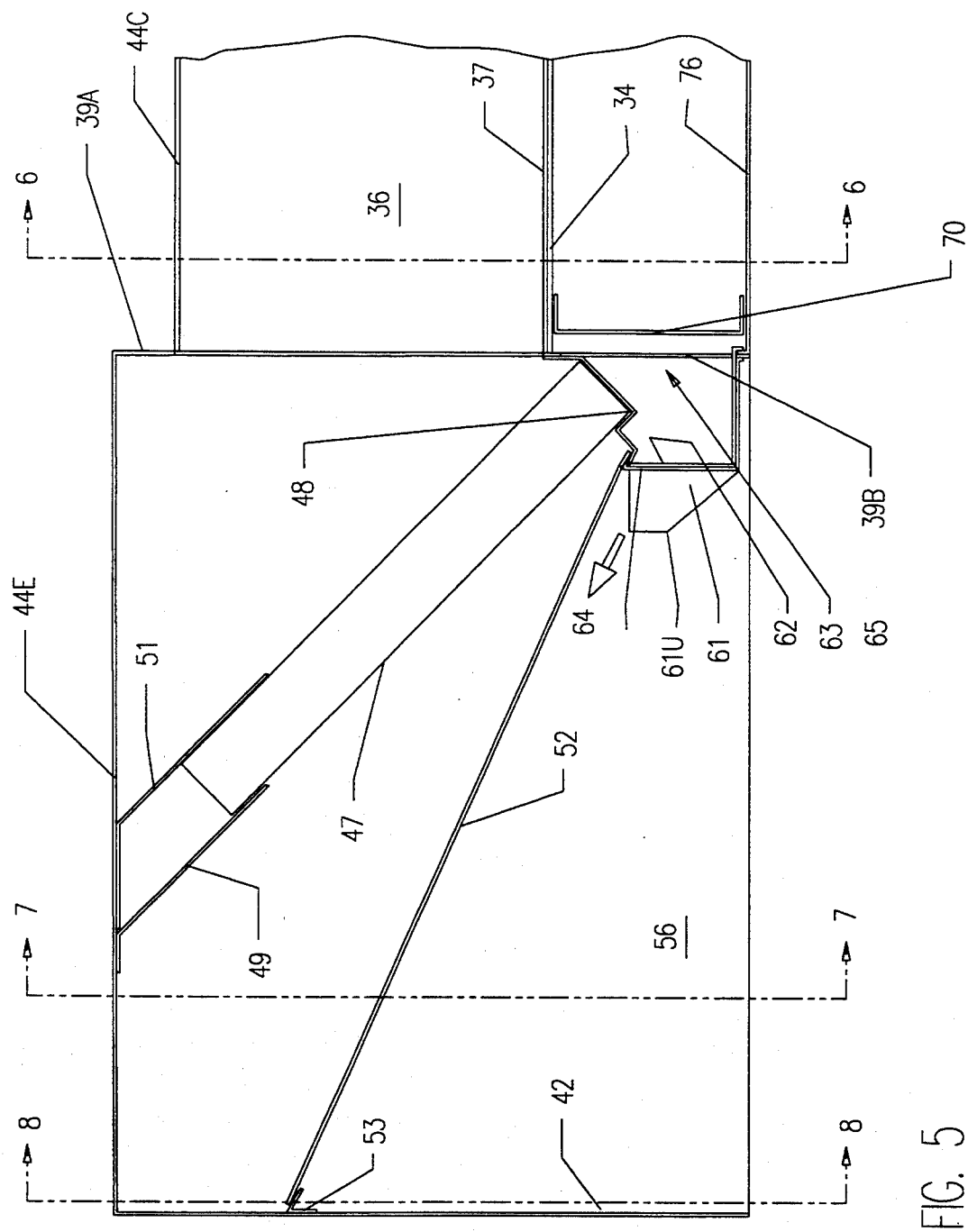
FIG. 5 is an enlarged view of a portion of FIG. 3.

Referring now to FIGS. 1, 2 and 5, the overhang portion 38 on the left-hand side of the oven includes the inside wall which comprises end wall 39A of the exhaust plenum and the end wall 39B of the make-up air plenum. It has a front wall 41, left-side wall 42, back wall 43 and top 44E which is shown spaced above the other walls in FIG. 2 to facilitate showing the large opening through wall 39A. The hanger channel 46 for the hood assembly is secured to the top 44E. Standard removable and washable filters 47 are rested in the lower filter rack 48 (FIG. 5) which is secured to the wall 39A, and are located between the outside upper filter rack rail 49 and inside upper filter rack rail 51, both of which are secured to the top 44E. An exhaust flow accelerator plate 52 has its lower edge received in the lower filter rack rail 48 and its upper edge supported on two horizontally-spaced upper support tabs 53 (FIGS. 5 and 8). The organization of the filters in the rack can be better seen in the view of FIG. 7. The position of the flow accelerator plate relative to the front 41 and rear 43 walls can be better seen in FIG. 8.

Figure 7:
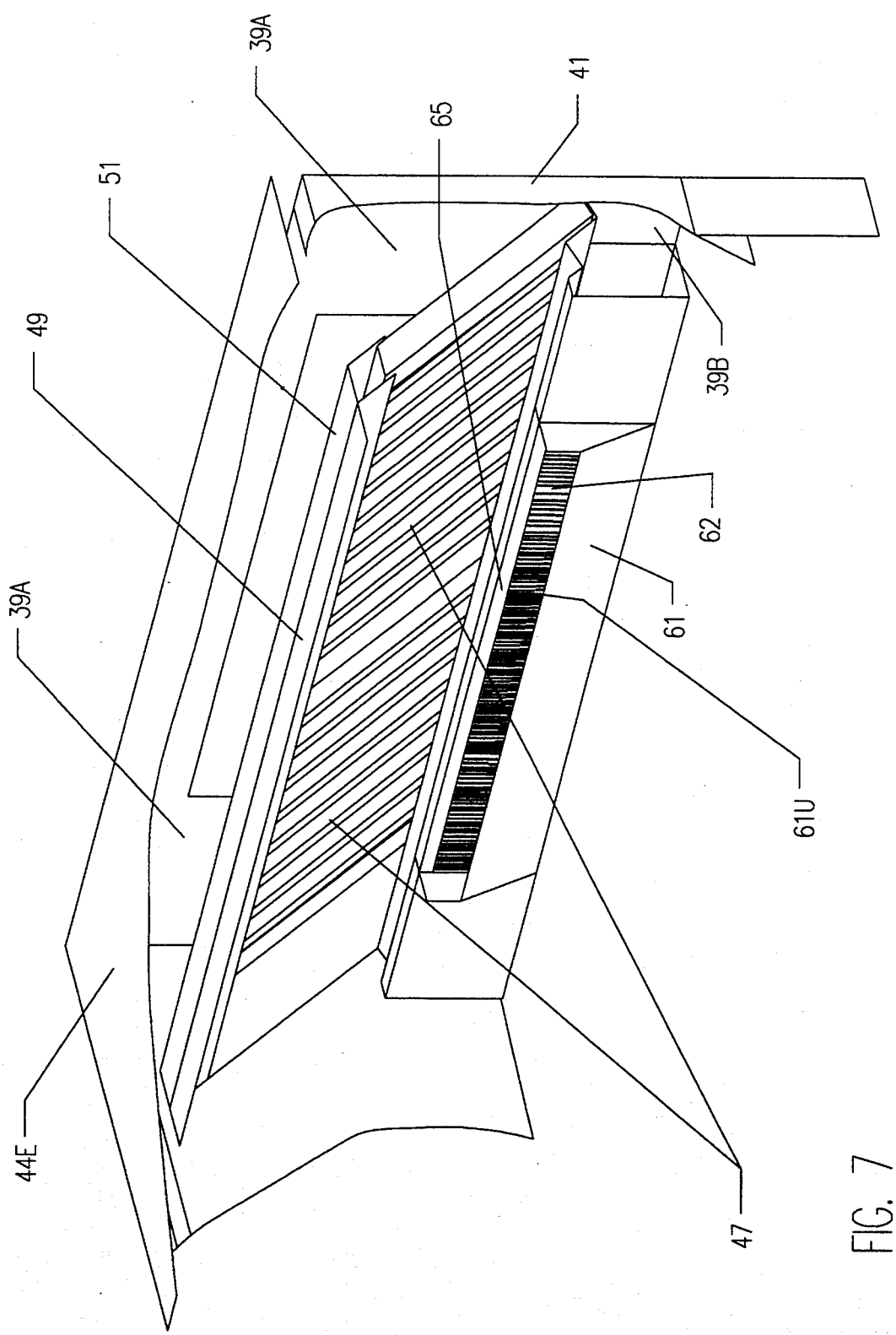
FIG. 7 is an isometric view showing details such as would be seen in a sectional view taken at line 7—7 in FIG. 5 and viewed in the direction of the arrows but omitting the flow accelerator plate and a front duct forming plate and portions of the enclosure.
Figure 8:
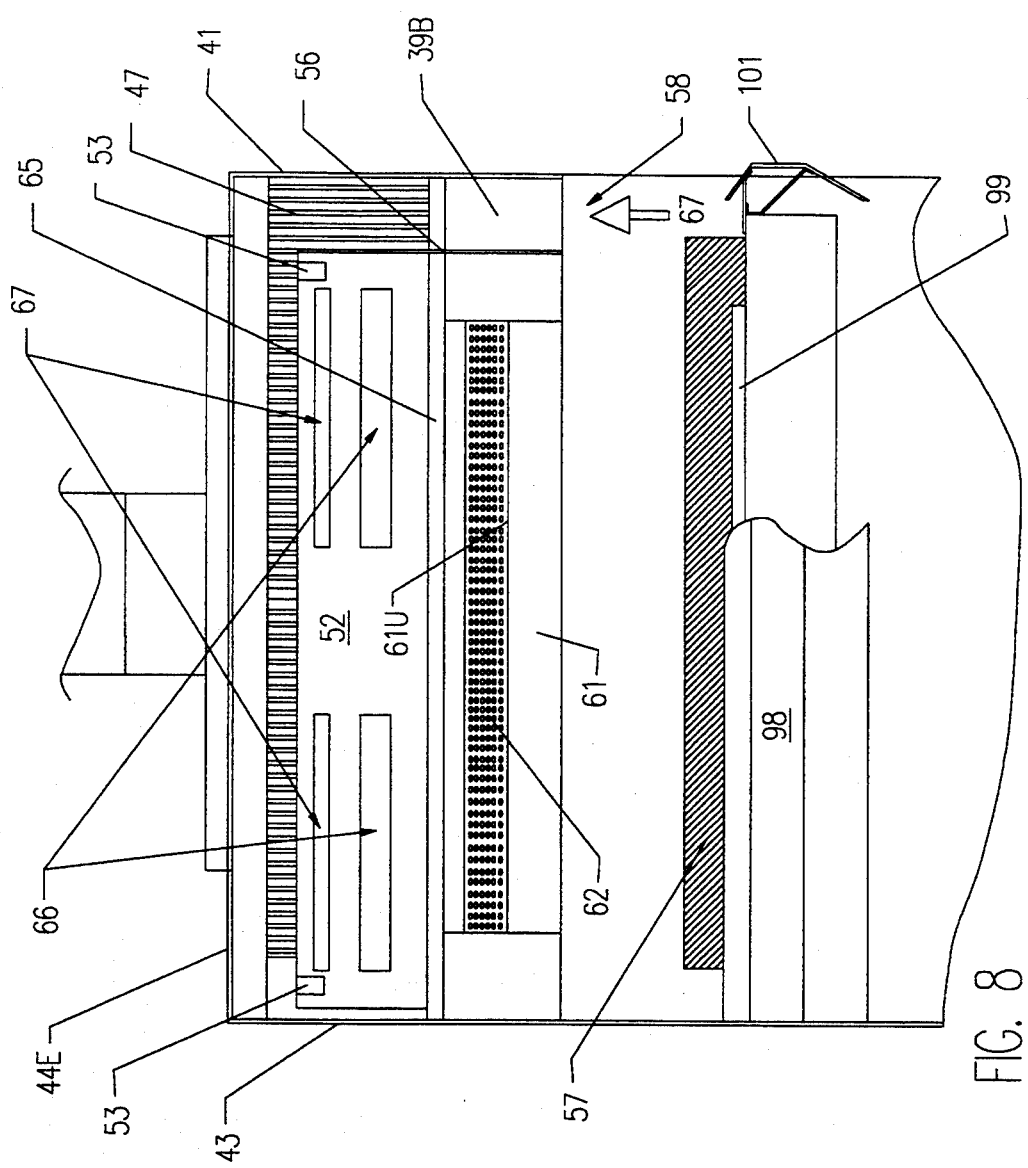
FIG. 8 is a fragmentary sectional view taken at line 8—8 in FIG. 5 and viewed in the direction of the arrows.

Referring further to FIGS. 5, 7 and 8, particularly in FIG. 8, it can be seen that there is a vertical wall 56 which can also be seen in FIG. 5 which is spaced behind the front wall 41 and which extends from the open bottom of the overhang hood portion up to the lower edge of the lower filter rack 48 and along and flush with the lower face of the accelerator plate 52 up to the upper edge of plate 52 where wall 56 is fastened to wall 42. Wall 56 extends laterally from the inside wall 39B to the outside wall 42, being secured to both of these walls. This wall 56, combined with the front wall 41, wall 39B and the filter 47 provides an exhaust duct through which any heat or fumes coming from the oven end opening 57 and from any product on the conveyor and toward the front of the conveyor can be drawn up in the direction of arrow 58 into the duct, through the filter 47 and into the exhaust plenum.

Each end wall of the make-up air plenum 32 has an opening 63 in it through which make-up air from the plenum is discharged into the space in the overhang portion of the hood that is below the accelerator plate 52 and behind (to the left in FIG. 8) wall 56. There is a make-up air diverter 61 (FIGS. 2, 5, 7 and 8) which communicates through a diverter screen 62 (FIGS. 5, 7 and 8) with the opening 63 (FIGS. 5 and 6) in the make-up air plenum end wall 39B and directs make-up air upward in the direction of arrow 64 toward plate 52. The make-up air diverter screen 62 is perforated to diffuse the air passing through it. The screen itself has a slightly L-shaped cross section as seen in FIG. 5, with an upper edge hooked over the top of rail 48 (under plate 52) and lower edge hooked over the lower edge of opening 63 in wall 39B. There is a block off panel strip 65 along the upper portion of screen 62 to prevent make-up air from flowing directly out horizontally over the upper edge 61U of diverter 61. The screen perforations are sized and spaced such that the area of the screen is 42.3% open. The screen 70 on the inside of the opening 63 in wall 39B is of the same nature as screen 65.

The two lower, elongate and horizontally extending and horizontally spaced slots 66 in the accelerator plate, and the two elongate, horizontally extending and horizontally spaced upper slots 67 in the accelerator plate are located respectively about midway up and about 70% of the distance up from the lower edge of plate 52. They provide the desired acceleration through them of fumes and heat which rise from the conveyors into the hood overhang portions, for efficient and rapid evacuation along with the make-up air also flowing and diverted upward along the face of the plate 52 for quick and efficient removal of heat and fumes.

The space bounded on the front by the front wall 41 of the overhang portion, and on the rear by the wall 56 on the outside by hood end wall 42 and on the inside by the combinations of the front end portions of walls 39A and 39B is bounded on the top by a portion of filter 47 as best shown in FIG. 8. This chamber provides a downwardly opening duct establishing a flow of heated air with entrained fumes upward in the direction of arrow 67 from the area above the upper deck conveyor at the front edge of the conveyor.

Figure 6:
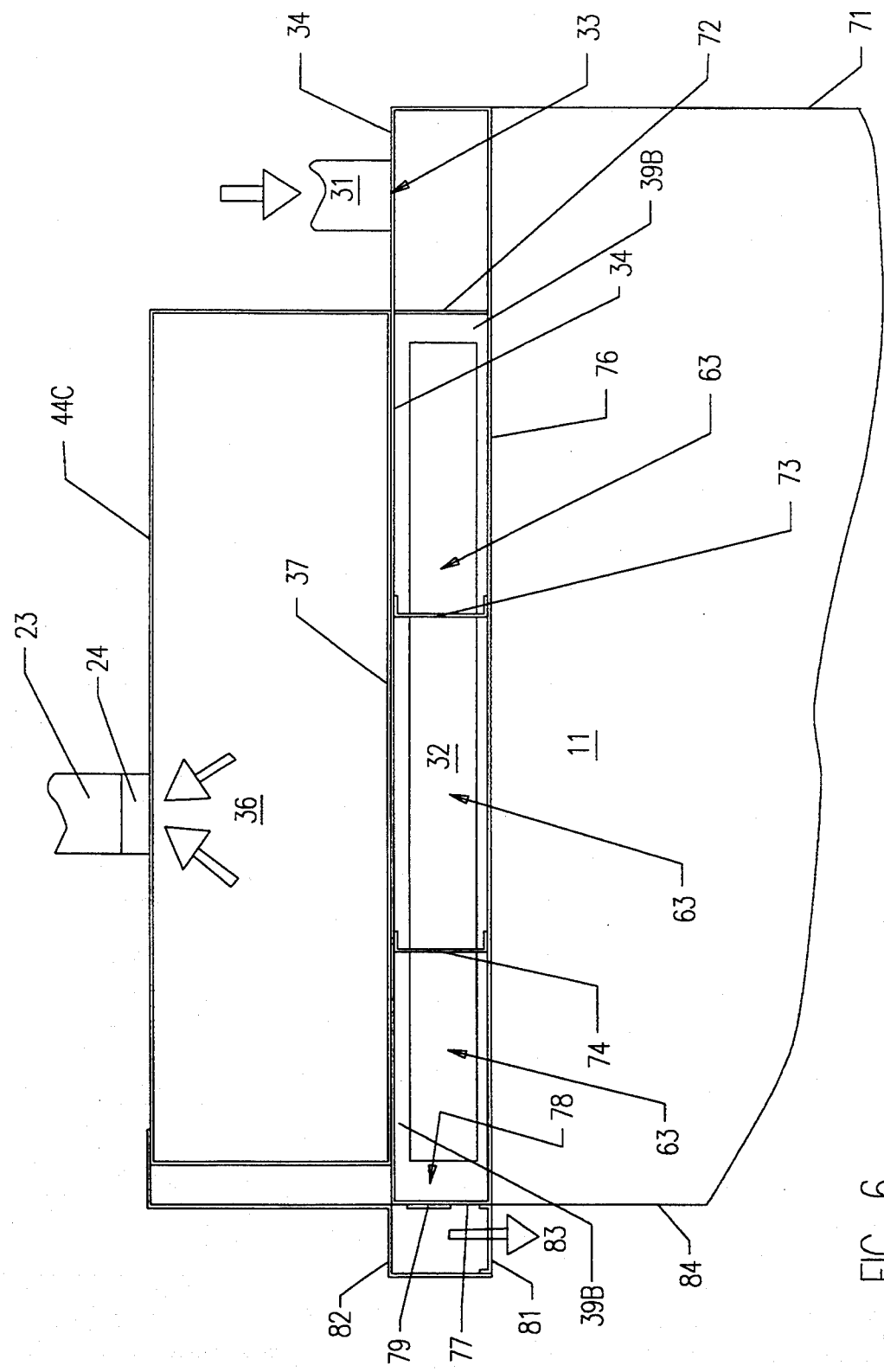
FIG. 6 is a fragmentary sectional view taken at line 6—6 in FIG. 5 (but on a smaller scale) and viewed in the direction of the arrows.

As indicated above, the make-up air is supplied into the make-up air plenum 32 by flow down through the supply collar 31 and the top 34 of the make-up air plenum which extends to the back wall of the oven. In the illustrated example, this supply duct is situated toward the left-hand end of the make-up air plenum. In order to balance the air flow from the rear to the front of the make-up air plenum and out the plenum end wall openings such as opening 63 in the left-hand end wall 39B, there is a set of interior screens 72, 73 and 74 (FIGS. 2 and 6). Each of these screens extends the full height of the plenum from the top wall 34 thereof to the bottom wall 76 thereof. Also, the screen 72 with its solid end panels 72E extends the full width of the plenum from the end wall 39B at the left-hand end to the comparable wall at the right-hand end. This screen has relatively large perforations in it such that the open area is 42.3% of the total area of the wall. In contrast, however, the screens 73 and 74 do not extend the full distance between the left and right-hand end walls but only to a point about two inches inboard from each of the end walls. Also, the perforations in these two screens 73 and 74 are such that there is only a 40.3% open area through these screens. Consequently, air entering the space between the screen 72 and 73 is diverted both to the left and to the right in a somewhat equal fashion, while some of it continues straight on through the screen 73 and some of it goes around the ends of the screen into the chamber between the screen 73 and 74. In that area, there is further balancing of the flow to the left and to the right, but at the same time permitting some additional flow to pass through that screen 74 to the front end wall 77 of the make-up air plenum. While the make-up air plenum rear screen 72 has perforations therein such that the area thereof is 42.3% open, the two make-up air interior screens 73 and 74 have small perforations therein whereby the open area of these two screens is only 40.3%.

In the make-up air plenum front end wall 77, there are two horizontally spaced slots 78 (FIGS. 2 and 6). Screen 79 is mounted to the outside face of wall 77 and covers the slots 78. This screen is provided with perforations providing 40.3% open area. In addition to the make-up air plenum front screen 79, there is a make-up air diverter outlet screen 81 covering the bottom of a channel formed by the cooperation of the make-up air plenum front wall 77 and the front make-up air diverter plate 82. This plate is typically made of stainless steel for appearance purposes and extends from the top 44C of the exhaust plenum downward in a spaced relationship from the front of the exhaust plenum, then horizontally to the front and downwardly spaced from the front wall 77 of the make-up air plenum 32. In this way, make-up air which has been introduced at the supply collar 31 and advanced all the way from the rear to the front wall of the make-up air plenum is discharged downward through screen 81 in the direction of arrows 83 along the front wall of the ovens 84, thereby cooling them. The perforation size in the screen 81 is such that the area is 40.3% open.

While the above-mentioned Welsh et al. patent discloses a hood system on a Middleby Marshall Pacesetter 360 oven, the illustrated embodiment of the present invention is associated with a Blodgett oven as mentioned above. While the Middleby Marshall oven has the control cabinet for the oven on top of it, the Blodgett oven has control cabinets on the back of it. Consequently, in the illustrated embodiment, there are some additional features shown and which will be mentioned here and which are included particularly to serve the Blodgett oven but which would not be used to serve the Middleby Marshall or certain other brands of ovens. These include a branch duct 86 (FIG. 3) from the make-up air supply blower into the inboard wall of the top portion 87 (FIGS. 1 and 2) of the supply duct 88 supplying make-up air into the control panel (not shown) in the back of the oven assembly. At the right-hand end of the control panel, there is a duct 89 (FIG. 2) having an inlet 91, horizontal duct assembly 92 having an outlet 93 entering the back of the exhaust plenum. Therefore, make-up air applied through the branch 86 and flowing downward into the drop 88 and outward to the right in the direction of arrow 94 (FIG. 2) into and through the control cabinet, picks up heat from the control cabinet and any exhaust fumes (if it is a gas-fired oven assembly) and takes it out in the direction of arrow 96 through the duct 89, duct 92, exhaust plenum 36 and out the exhaust collar and stack. For a Middleby Marshall application, if the ovens are gas fired, combustion products can be removed in the same manner as described in the above-mentioned patent. Instead of having the control panel air supply duct 88, an exhaust scoop 89 and attendant ductwork shown herein, make-up air supply to and heat removal pipework can be provided for the Middleby Marshall top-mounted control cabinet in any convenient way. Thus, the present invention is applicable to these and a variety of other conveyorized cooking ovens. By having the downflow air curtain as indicated by the arrows 83 in FIGS. 1 and 6, blowing down over the front walls 84 of the oven, the doors 97 of the upper and lower ovens can be opened without risk of burning the operator. The hood assembly is effective regardless of whether the conveyors in the two ovens are running from left to right or right to left.

In the aforementioned patent, heat and fume directors such as 98 in FIG. 1 (116 in FIG. 1 of the aforementioned patent) are provided at opposite ends of the upper conveyor belt 99 and spaced slightly from it as described in the above-mentioned patent and function in the same way. In addition, however, in the present case, directors 101 are provided at locations spaced slightly from the front side of the conveyors in the same manner as and cooperating with the directors 98 at the ends of the conveyors, to provide flow control at the front also for heat and fumes from the lower conveyors 102. These cooperate particularly well with the front duct portions pulling heat and fumes up in the direction of arrow 67 such as described above with reference particularly to FIG. 8 between the front wall 41 and the wall 56 in the left-hand end hood overhang, and the same function is achieved in the right-hand end overhang portion of the hood assembly.

As shown in FIGS. 1 and 3, end curtains 103 are provided at the back of the conveyors 99 and 102, being supported by the back wall 43 of the end overhang portion 38, and extending directly down from the back wall. This end curtain may actually be a single sheet of material extending down from the back wall 43 of the hood overhang portion 38 to a lower edge 104 at the same height as the bottom 106 of the lower oven. Similarly, a rear curtain 107 may be provided that the right-hand end of the oven extending down from the back wall of the right-side hood overhang to a lower end 108 which is below the lower oven conveyor. Like the curtain 103 at the left, curtain 107 keeps heat and fumes away from the building wall 13. As described in the aforementioned patent, these aid in the control and direction of the heat and fumes generated in the lower oven and directed upwardly into the hood overhang portions. It should be understood, of course, that the moving belt of the upper conveyor is shown schematically at 99 whereas the moving belt of the lower conveyor assembly is shown schematically at 102. Details of these are described more specifically in the above-mentioned patent and are not part of the present invention and need not be described more fully. However, to the extent disclosure in the aforementioned patent would be helpful to the understanding of the present invention, the content thereof is incorporated herein by reference.

As an example of the type of filters 47 preferred, each of the hood end overhang portions would contain two 16 inch by 20 inch UL classified baffle-type grease filters. As an example of typical heights, the lower edge of each of the overhanging hood end portions may be 65 ½ inches above the floor 12 for the Blodgett oven. The overall height of the make-up air plenum and exhaust plenum from the bottom 76 of the make-up air plenum to the top 44 of the exhaust plenum is 18 inches. The typical width of the hood end projections from the intermediate wall 39A/B to the outer end wall 42 is 24 inches. Similarly, the overall height of the end projection is 18 inches and the distance down from the top 44 to the accelerator plate 52 upper edge at the outside wall 42 is about 7 ½ inches. The space between walls 41 and 56 (FIG. 8) is about 2 inches. The overall width of the hood assembly from end 42 to the opposite end is about 118 inches. For the different makes and sizes of ovens, the dimensions may be different, so some of the hood dimensions will be different. The modular construction of the hood assembly of the present invention makes it readily adaptable to such differences. This can be seen most readily by reference to FIG. 2 where the parts are shown in a way making it evident that the exhaust plenum can be assembled as a separate unit, as can the make-up air plenum, as can the conveyor overhang end units. Then these units, sized as desired, can be assembled to fit the requirements of the oven with which they are to be used.

In the illustrated example, the exhaust duct is about 13 inches square and the make-up air supply collar 31 is 14 inch diameter. The exhaust and make-up air blowers are established such that the exhaust flow through duct 23 is about 2,000 cubic feet per minute (CFM) and the make-up air flow is about 1,600 CFM. It is preferable that the difference in the flow rates be from 300 to 500 CFM.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An exhaust system comprising:
   a hood including front, rear, top, and end walls for mounting over and covering horizontal area occupied by a conveyorized oven;
   a pair of vertically extending intermediate walls in the space between the end walls;
   first panel means located between the intermediate walls and cooperating with the top, front, rear and intermediate walls to form an exhaust plenum;
   a bottom panel located between the intermediate walls and cooperating with the first panel means and the front, rear and intermediate walls to form a make-up air plenum;
   each of the intermediate walls cooperating with one of the end walls to form overhang portions of the hood at each end of the plenums for extending over otherwise uncovered end portions of a conveyor portion of the oven at both sides of the oven,
   each of the intermediate walls having a make-up air outlet opening therethrough for delivery of make-up air from the make-up air plenum into the overhang portions,
   each of the intermediate walls having an exhaust inlet opening therethrough for reception of exhaust gases from the overhang portions into the exhaust plenum,
   a first partition in each of the overhang portions and cooperating with the top, front, rear, end, and intermediate walls of the overhang portion to provide a filter chamber therein;
   a filter in each filter chamber;
   a second partition in each of the overhang portions and cooperating with the first partition and the top, front, end and intermediate walls of the overhang portion to provide a duct up through the overhang portion directly to a portion of the filter at the front of the overhang portion.

2. The system of claim 1 and further comprising:
   a make-up air diverter adjacent the second opening and the first partition in each of the overhang portions and directing make-up air flowing from the second opening upward along the first partition.

3. The system of claim 2 and wherein:
   the make-up air plenum has a slot adjacent the the front wall with a diverter associated with the slot and opening downwardly to direct make-up air downward along the front of the conveyorized oven.

4. The system of claim 2 and wherein:
   the first partition in each of the overhang portions has aperture means therein admitting hot gases from the oven and make-up air from the diverter up through the first partition to the filter.

5. The system of claim 4 and wherein:
   the first partitions include removable panels for access from under the said overhang portions to the filters for removal of the filters.

6. The system of claim 5 and further comprising:
   an oven under the hood and having a food conveyor through it, with portions of the conveyor extending from the sides of the oven under the overhang portions, the extending portions of the conveyor having front marginal portions below the ducts whereby the hood is adapted to receive air rising above the extending portions of the conveyor.

7. The system of claim 6 and further comprising:
   exhaust blower means coupled to the exhaust plenum for pulling air from the hood and exhausting the air outside a building; and
   make-up air blower means coupled to the make-up air plenum for introducing air from outside a building into the hood,
   the exhaust blower removing gases from the system at a rate exceeding the rate at which the make-up air blower introduces air into the system.

8. The system of claim 7 and in which the difference in the rates is between 300 and 500 cubic feet per minute.

9. The system of claim 6 and wherein:
   air flow director means are mounted adjacent the front marginal portions of the extending portions of the conveyor, the director means being shaped to direct air from the front marginal portions upward toward the second partitions for induction through the ducts into the filters.

10. The system of claim 9 and wherein:
    the oven has a second conveyor extending under the first conveyor,
    the flow director means having a lower edge below the level of the extending portions of the first conveyor and being shaped to intercept air flowing outward from under the first conveyor, and to redirect the air around the front marginal portions of the first conveyor toward the ducts.

11. The system of claim 10 and further comprising:
    additional flow director means associated with the first-mentioned flow director means and extending across the ends of the extending portions of the first conveyor and being shaped to intercept air flowing outward from under the ends of the first conveyor, and to redirect the air around the ends of the first conveyor toward the portion of the oven above the first conveyor for deflecting hot air rising from said second conveyor back toward the oven and the conveyor covering portions of the hood.

12. An exhaust system comprising:
    a hood including front, rear, top, and end walls for mounting over and covering horizontal area occupied by a conveyorized cooking oven;
    a pair of vertically extending intermediate walls in the space between the end walls;
    a first divider panel located between the intermediate walls and cooperating with the top, front, rear and intermediate walls to form an exhaust plenum; and
    a bottom panel located between the intermediate walls and cooperating with the divider panel and the front, rear and intermediate walls to form a make-up air plenum.

13. The exhaust system of claim 12 and wherein:
    the make-up air plenum has a downwardly opening diverter adjacent the the front wall to direct make-up air downward along the front of the conveyorized oven.

14. The system of claim 12 and further comprising:
    exhaust blower means coupled to the exhaust plenum for pulling air from the hood and exhausting the air outside a building.

15. The system of claim 12 and wherein:
    at least one of the intermediate walls cooperates with at least one of the end walls to form an overhang portion of the hood for extending over an otherwise uncovered end portion of a conveyor portion of the oven.

16. The system of claim 15 and wherein:
the one intermediate wall has a first opening in the exhaust plenum and a second opening in the make-up air plenum, both openings communicating with the overhang portion of the hood.

17. The system of claim 16 and further comprising:
filters in the overhang portion of the hood in the path of air flow from the second opening to the first opening,
a portion of the filters being isolated from the path of air flow from the second opening to the first opening.

18. The system of claim 17 and further comprising:
a flow accelerator plate between the second opening and the filters in the path of air flow from the second opening to the filters.

19. The system of claim 18 and further comprising:
a make-up air diverter adjacent the second opening and the accelerator plate and directing air flowing from the second opening upward along the accelerator plate.

20. The system of claim 19 and wherein:
the accelerator plate has horizontally extending slots therein admitting heat and gases and make-up air from below the accelerator plate to the filter.

21. The system of claim 20 and wherein:
two of the slots are horizontally-spaced and located about half-way up the plate from a lower and horizontally-extending edge of the plate, and
two of the slots are narrower in vertical dimension than the first-mentioned two.

22. The system of claim 21 and wherein:
the two narrower slots are of the same horizontal length as the first-mentioned two and are vertically aligned with the first-mentioned two and are located above the first-mentioned two.

23. The system of claim 19 and wherein:
the exhaust plenum and the make-up air plenum are modular.

24. In a building having a room therein with a ceiling and roof over it, and exhaust and make-up air blower means outside the building, a cooking and ventilation system comprising:
a cooking unit having a heating station and conveyor means extending out beyond an end of the heating station; and
a hood assembly having a make-up air plenum directly above the cooking unit and an exhaust plenum directly above the make-up air plenum,
an inlet in the make-up air plenum coupled to the make-up air blower means, and
an outlet in the exhaust plenum coupled to the exhaust blower means.

25. The system of claim 24 and wherein the hood assembly has:
a downwardly-opening end portion covering the portion of the conveyor extending out beyond an end of the heating station;
an opening in the side of the make-up air plenum communicating with the interior of the hood end portion;
a filter in the end portion;
a partition between the opening and the filter;
a flow diverter associated with the opening and the partition to direct make-up air flow from the make-up air plenum along the partition from the opening toward the filter.

26. The system of claim 25 and further comprising:
a second partition in the hood end portion near the front of the hood end portion and providing an exhaust duct directly upward adjacent the front of the end portion from the bottom of the end portion to the filter.

27. The system of claim 25 and wherein:
the hood assembly is an assembly of the exhaust plenum as a module, make-up air plenum as a module and the hood end portion as a module.

* * * * *